United States Patent [19]

Versic

[11] Patent Number: 4,758,288
[45] Date of Patent: Jul. 19, 1988

[54] ENCAPSULATED LITHIUM GRANULES AND METHOD OF MANUFACTURE

[75] Inventor: Ronald J. Versic, Dayton, Ohio

[73] Assignee: Ronald T. Dodge Co., Dayton, Ohio

[21] Appl. No.: 59,534

[22] Filed: Jun. 8, 1987

[51] Int. Cl.⁴ .................................... C06B 45/32
[52] U.S. Cl. ........................... 149/6; 149/109.6; 427/216; 427/318; 427/402; 427/409; 428/407
[58] Field of Search ............... 149/6, 109.6; 427/216, 427/318, 402, 409; 428/407

[56] References Cited

U.S. PATENT DOCUMENTS

| | | | |
|---|---|---|---|
| 3,788,906 | 1/1974 | Schroeder | 149/6 |
| 3,878,121 | 4/1975 | Roche et al. | 149/8 |
| 4,017,342 | 4/1977 | Geisler et al. | 149/5 |
| 4,634,479 | 1/1987 | Buford | 149/6 |
| 4,677,211 | 6/1987 | Buford | 427/216 |

Primary Examiner—Stephen J. Lechert, Jr.
Attorney, Agent, or Firm—Donald P. Gillette

[57] ABSTRACT

This invention relates to fuel granules of lithium having multiple coatings thereon and to the method of making the coated granules.

16 Claims, 1 Drawing Sheet

ENCAPSULATED LITHIUM GRANULES AND METHOD OF MANUFACTURE

A number of proposals have been made to use the oxidation of lithium as a source of heat. In particular, U.S. Pat. No. 4,634,479 to Buford describes a lithium-based fuel consisting of metallic lithium pellets encapsulated in predominantly fluorine substituted polyolefin based polymeric material. The pellets are described as shot shaped and sized and as having diameters between one and 25 millimeters. The lithium metal in the pellets constitutes at least 60% of the total weight, and the coating material in which each pellet is encapsulated is said to be selected from the group consisting of polyperfluoroalkoxys, polytetrafluoroethylene, tetrafluoroethylene telomers, and mixtures thereof.

An oxidation reaction between the lithium and the coating material begins when the lithium is heated to its melting point of about 180° C. The reaction is exothermic and generates a temperature of about 1000° C., well in excess of the melting point of lithium and of the coating material, so that, if there is a quantity of such coated pellets in a container, the ignition of one pellet will result in the hypergolic oxidation reaction of all. Such a reaction is very useful in generating power in closed systems that have no way of getting oxygen to the fuel, since the reaction between the lithium and the above-mentioned coating does not require oxygen.

However, it has been found that a closed container of such coated pellets can spontaneously ignite without there being any apparent means to raise the temperature of any of the pellets to the presumably-required 180° C. The pellets are not perfectly spherical by any means, and they vary in volume by a ratio of about 15,000:1, so that a container supposedly filled with the pellets has a substantial empty space, or ullage, in it. Buford calls for the ullage volume to be about 20% of the entire volume of the container. This empty space allows at least some of the pellets to change position relative to each other as the container is moved about, and it is my belief that when such movements are abrupt, as they are when the continer is sharply jolted or dropped, the resultant frictional rubbing of some of those pellets against each other can raise the temperature of at least one of them sufficiently to initiate the exothermic reaction, which then spreads hypergolically throughout the rest of the pellets until at least one of the reactants is used up.

It would seem that such frictional engagement should not occur, since the preferred coating material is a tetrafluoroethylene telomer sold under the trademark Vydax ® by E. I. DuPont de Nemours, Inc. and described in U.S. Pat. Nos. 2,540,088 and 3,067,262. This material is used in the lithium-based fuel described by Buford because it reacts strongly with lithium, but Vydax ® is also well known as a solid lubricant because of its low coefficient of friction. However, the telomeric form of tetrafluoroethylene does not have very good structural integrity and, when applied as a coating to the surface of a lithium core, tends to flake off rather easily, leaving an exposed portion of the core open to possible frictional engagement with a similarly exposed portion of the core of another pellet or with the wall of the container. It is possible for that frictional engagement to generate enough heat to initiate the exothermic reaction between that pellet and the reactive coating of the same or an adjoining pellet.

The polymeric form of tetrafluoroethylene, which is sold under the well-known trademark Teflon ®, consists of a much higher number of the basic radicals than the telomer. Since the polymer contains the same reactive constituents as the telomer, and has much greater structural integrity than the telomer, it would appear to be preferable to use Teflon ® as the reactive coating material. However, Teflon ® is far less soluble than the telomer and is, therefore, very difficult to apply as a coating on lithium cores.

OBJECTS AND SUMMARY OF THE INVENTION

It is an object of this invention to provide lithium pellets, or granules, that are resistant to the heat-producing effects of vibration.

Another object is to provide, on a fuel granule comprising a lithium core and a layer of material that oxidizes the lithium in an exothermic reaction when the lithium is heated to its melting temperature, a barrier layer that is free of gaps and pinholes to keep parts of the surfaces of any such cores in a vessel containing a large number thereof from rubbing against each other.

Another object is to form the barrier layer between the surface of the core and the reactive layer.

A further object is to form the barrier layer over the reactive layer to prevent the reactive layer from flaking off.

A further object is to provide a method of applying multiple coatings to metallic lithium granules, at least one of the coatings being material exothermally reactive with lithium and at least one other of the coatings being a barrier layer less reactive with lithium and applied by thermal diffusion.

It is suggested in column 3 of the Buford patent that, in addition to a layer of reactive material on a lithium core, another layer of a different material may be applied, either before the reactive layer is applied or on top of it, but neither the nature nor the purpose of the additional layer is specified, except to suggest that it may increase the impermeability of the reactive layer to some unidentified substance. No mention at all is made of preventing core-to-core friction nor of preventing the generation of heat. In particular, Buford does not consider the additional layer to be essential: he states that its use should be avoided in the type of power system he proposes.

Further objects will become apparent to those skilled in the art of the present invention after they have studied the following description together with the accompanying drawings.

In accordance with this invention, granules of lithium having a major dimension, referred to as the diameter, for the sake of convenience, of about 0.1 mm to about 25 mm are subjected to multiple successive encapsulation procedures. One of the procedures applies, to a granular base, a coating of a material that has relatively good structural integrity and is substantially free of pinholes, and another such procedure applies, to a granular base, a layer of a telomer that is exothermally reactive directly with molten lithium. The term "granular base" is intended to include both the surface of the lithium, directly, and the surface of a coating that is, itself, on a granular base.

A matter of concern in applying a highly reactive coating material directly to the lithium surface is that it must be done at a temperature safely below the melting point of lithium and, preferably, in an environment not conducive to initiating an undesired reaction between the lithium and either the coating material or any other oxidizing agent in the environment in which the coating process is carried out. A satisfactory environment is one in which an inert gas, such as argon, purges the container in which the reactive material is being applied. Deposition of a predominantly fluorine substituted polyolefin based telomeric material, such as Vydax ®, from a solution or a suspension thereof in a liquid carrier, followed by removal of the carrier, for example, by evaporation, is a satisfactory way of applying the telomeric material to the lithium surface.

If the less reactive barrier coating has previously been applied to cover the entire surface of the lithium, it is not necessary to carry out the deposition of the reactive material in an inert atmosphere.

A preferred material to use as the layer of good structural integrity is a poly-para-xlylene polymer, known by the generic name of parylene. Such material not only forms a thin layer free of pinholes holes and having good structural integrity, but one that is conformal to the surface on which it is deposited. That is, the thickness of the parylene layer is substantially uniform at all parts of the underlying surface, even if the latter has sharp edges or points on it.

The parylene layer can be deposited using the technique and apparatus shown and described in U.S. Pat. No. 4,508,760, in which I am a joint inventor.

The reactive coating can be separated from the lithium by forming the layer of good structural integrity first and then forming the reactive coating as a second layer, or the two layers can be laid down in reverse order. If the layer of good structural integrity is formed first, the second layer may have yet another layer of material of good structural integrity formed on top of it to hold the second layer in place, as well as to form an additional barrier between the lithium core and another lithium core.

DETAILED DESCRIPTION OF THE INVENTION

Figure 1:
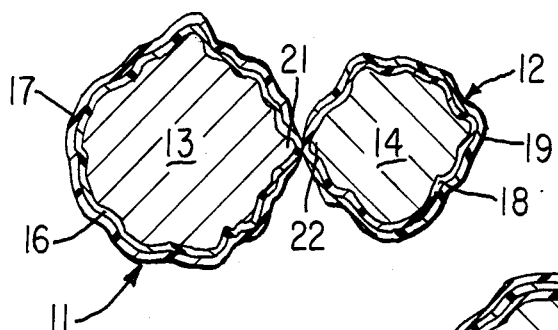
FIG. 1 shows two granules, each having multiple coatings on it in accordance with this invention.

FIG. 1 shows cross-sectional views of two granules 11 and 12 made according to one embodiment of the invention and each consisting of a metallic lithium core 13 and 14, respectively, with multiple coatings 16, 17 and 18, 19 respectively, on it. The diameters of the cores may have any value between about 0.1 mm and about 25 mm. The outer layer 17 of the granule 11 is formed of material that is highly reactive with lithium at temperatures above the melting point of lithium, which is about 180° C., in an exothermic oxidizing reaction that produces temperatures on the order of 1000° C., far above the melting point of lithium. As a result, once such a reaction is started in a container holding a quantity of lithium granules coated with the reactive material of the layer 17, the reaction continues hypergolically between these reactants until at least one of them is used up. When the reaction takes place in response to deliberate initiation, it can be very useful in generating heat to produce mechanical power, as described by Buford, for example.

The present invention solves the problem of avoiding undesired initiation of the hypergolic reaction while still allowing the reaction to be deliberately initiated easily. In accordance with this invention, the inner layer 16, which is formed on the core 13 before the reactive layer 17 is formed, is a barrier that prevents unintended contact between the lithium core 13 and the reactive material in the layer 17. Therefore, it is important that the material of which the barrier layer is formed have good structural integrity without any gaps or pinholes through which such undesired contact could take place. One of the problems with many types of materials that might be thought of as being suitable as barrier material to be applied to granular bases in liquid form or by means of a liquid carrier is that the surface tension of the liquid smoothes out the overall surface of the coating but, in doing so, makes the coating too thin over protuberances or edges, such as the portion 21 that juts out from the surface of the core 13.

I have found that an excellent material with which to encapsulate lithium cores to form the barrier layer 16 is a thermoplastic polymer, the generic name for which is parylene. Parylene is commercially available as dimers that can be polymerized in a process that forms poly-para-xylylene (parylene N), monochloro-poly-para-xylylene (parylene C), and dichloro-poly-para-xylylene (parylene D).

The second granule 12 is made of the same components as the granule 11 and is therefore identical with it, except for its shape. The granule 12 has a lithium core 14, a barrier layer 18 and a reactive coating 19. The purpose of including two granules in FIG. 1 is to illustrate the type of physical relationship that is likely to exist between at least two of the huge number of granules contained in a fuel cell. The core 13 has a projection 21 and the core 14 a projection 22, neither of which is covered by the respective reactive layer 17 or 19. Whether the layers 17 and 19 once covered the projections 21 and 22 and flaked off due to movement of the granules against each other or the projections were so sharp that the layers 17 and 19 never did cover them is unimportant. In the absence of the barrier layers, the metallic lithium cores 13 and 14 would contact each other. Lithium is a soft metal, but with a sufficiently sharp jolt, it is possible that the projections 21 and 22 would rub against each other. If, as in the Buford pellets, the cores had no barrier like the layers 16 and 18, such rubbing of metal on metal could generate enough heat to initiate the exothermic reaction between either or both of the cores 13 and 14 and the reactive material in the layer 17 or the layer 19. In either case, the reaction would spread hypergolically.

The barrier layers 16 and 18, being free of gaps and pinholes and, in fact, being conformal to the surfaces on which they are formed, keep the lithium cores separate from the reactive layers 17 and 19. Furthermore, parylene is used as a dry lubricant, and rubbing of the layer 16 against the layer 18 would, therefore, not tend to generate heat. The chemical make-up of parylene is such that it is not nearly as reactive with lithium as is the material used to form the layers 17 and 19, and parylene has a higher melting point than lithium. All of those factors act to reduce the danger of undesired initiation of the oxidation of the core material by the reactive material in the layers 17 and 19.

Figure 2:
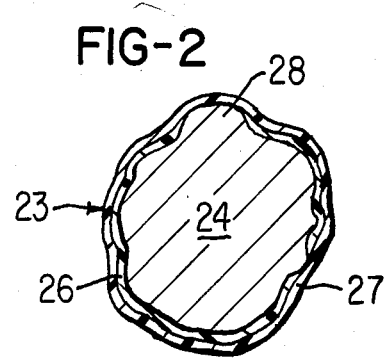
FIG. 2 shows another embodiment of this invention in which the coatings formed on the lithium cores in one order in FIG. 1 are formed on a lithium core in reverse order.

FIG. 2 shows an alternative granule 23 that has a lithium core 24 coated first with a layer 26 of reactive material, such as that used for the outer layers 17 and 19 in FIG. 1. A barrier layer 27 is formed over the inner layer 26, and, although it does not separate the core 24 from the reactive inner layer 26, the fact that the layer 27 is free from gaps and pinholes keeps the entire core 24, including a projection 28, from frictionally engaging any other core or the wall of the vessel containing the cores.

An advantage of encapsulating the granular base consisting of the core 24 and the reactive layer 26 by the barrier layer 27 is that doing so prevents the reactive layer from flaking off and becoming separated from the core. In the absence of a retaining barrier layer 27, such separation of the core could take place before the cores 24, coated only with the single layer 26, reached the fuel container expected to be their final destination. This could mean that the fuel container would have an inadequate amount of the reactive material, i.e., less than the stoichiometric amount.

Figure 3:
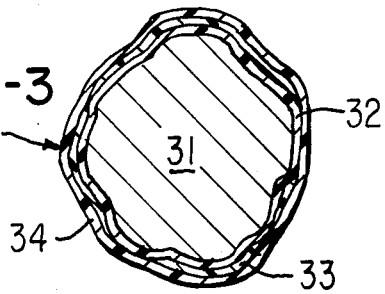
FIG. 3 shows still another embodiment of the invention in the form of a granule comprising a lithium core and three coatings.

FIG. 3 shows a cross-sectional view of a granule 29 that comprises a lithium core 31 triply coated with an inner barrier layer 32 of parylene, an intermediate layer 33 of reactive material, such as a tetrafluoroethylene telomer, and an outer barrier layer 34 of parylene. This structure has the advantage of separating the reactive layer 33 from the core 24 and, at the same time, preventing the reactive material from flaking off.

Figure 4:
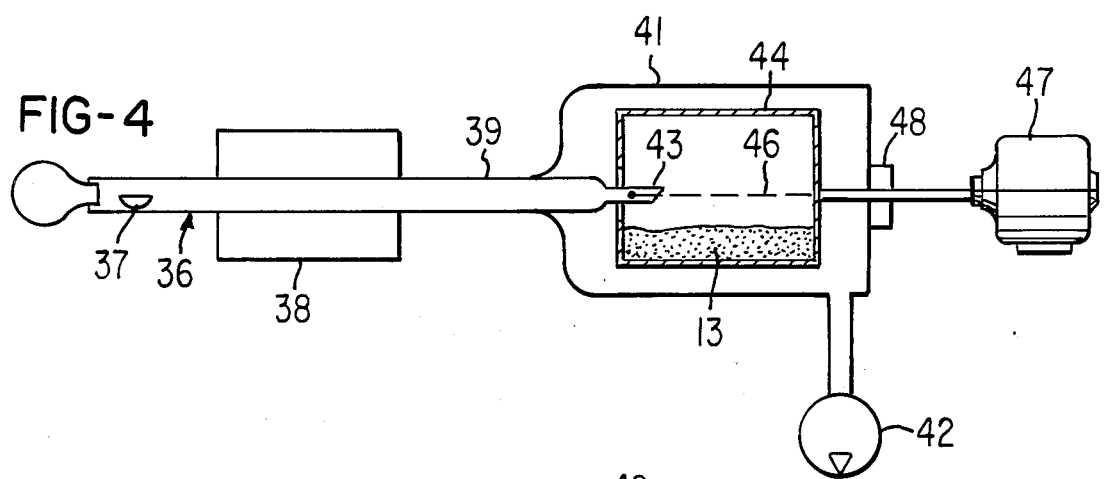
FIG. 4 is a schematic representation of apparatus for depositing a conformal layer of parylene on granular bases.

The parylene barrier layer 16 in FIG. 1 can be deposited by the apparatus in FIG. 4. The apparatus includes a refractory tube 36 closed at one end and containing a boat 37 with any of the parylene dimers, such as diparaxylylene, monochloro-dipara-xylylene, or dichloro-dipara-xylylene in it. The dimer is volatilized in the tube 36 and passes to a pyrolysis furnace 38 that operates at a temperature of about 680° C. A pyrolysis tube 39 follows the furnace and provides a reaction zone for converting the dimer to a reactive vapor of the corresponding, highly reactive monomer.

The monomer is then transferred to a vacuum deposition zone that includes a housing 41, the interior of which is evacuated to a low pressure on the order of 0.1 torr by a vacuum pump 42. The tube 39 has a necked-down end portion 43, and the highly reactive vapor monomer is injected into a rotable drum 44 through the necked-down portion. The drum is partially open at the end that receives the necked-down portion of the pyrolysis tube 39, so that it is in open communication with the vacuum conditions of the housing 41.

Disposed within the drum 44 is a supply of granules, such as lithium cores like the core 13 in FIG. 1. These cores typically have a mean diameter of about 0.1 mm to about 25 mm. Also disposed inside the drum and rotatable therewith is a screen 46 that sifts the cores 13 as they are being tumbled, thereby preventing agglomeration and tending to maintain their initial particle size distribution.

The drum is rotated on its axis by a motor 47, the shaft of which extends into the housing 41 through a vacuum seal 48. As the lithium cores are tumbled in the drum 44 and sifted through the secreen, the active monomer present in the vacuum chamber is adsorbed on the surfaces of the cores and is immediately polymerized into an extremely thin barrier layer, which is shown in FIG. 1 as the layer 16, and which conforms to the surface configuration of the granular base. The thickness of this coating on each core is less than about 10 microns and is usually in the range of about one micron to about six microns. Despite the extremely thin nature of the coating, it is evenly distributed and truly conforms to the surface of the granular base without any significant tendency to agglomerate. Apparently, the coating is formed on a molecule-by-molecule basis and provides excellent resistance to penetration, either by material migrating outwardly from the lithium core 13 or inwardly from the reaction layer later to be formed on the barrier layer.

While the granular base on which the barrier layer is deposited by the apparatus in FIG. 4 has been identified as the cores 13 of FIG. 1, it may also be the cores 24 of FIG. 2 coated with the reactive layer 26. They are then subject to the very problem with which this invention is concerned: avoidance of heat generation by excessive acceleration of the granules relative to each other. In order to keep the granules from rubbing too harshly against each other and so creating enough heat to start the undesired reaction, the rate of rotation of the drum 44 should be kept relatively low, typically not more than about 100 r.p.m.

The layer of reactive material, whether it is on top of the barrier layer, as are the reactive layers 17 and 19 in FIG. 1, or under the barrier layer, as is the reactive layer 26 in FIG. 2, or between barrier layers, as is the layer 33 in FIG. 3, may have varying thicknesses but will generally entirely encapsulate the granular base on which it is formed, although it may have some gaps and may flake off, as previously noted. The thickness is dependent on the desired ratio of the telomeric material to the lithium in the final product. Thus, the stoichiometry of the reaction in which the fuel is used, the presence or absence of other oxidants in addition to the telomeric material, and other such factors will determine the thickness of the reactive layer. According to preferred embodiments of the invention, the thickness of the reactive layer will generally be 0.60 inches or less and may be as little as 14 microns or less.

As described in the Buford patent, a suitable material that reacts strongly with lithium in the molten state of the latter and is thus suitable to be used as the reactive layer in any of the embodiments in FIGS. 1-3 is a predominantly fluorine substituted polyolefin based material. This means that other components, usually fluorine, will be substituted for about 70-75% or more of the hydrogen atoms of the basic polyolefin. Typical commercially available materials are tetrafluoroethylene and perfluoroalkoxy compounds. While the polymeric form of tetrafluoroethylene, which is sold under the trademark Teflon ®, has the proper chemical constituents, it is very insoluble and thus cannot be deposited out of a solution onto the granular base. However, tetrafluoroethylene in the lower molecular weight range referred to as telomers are sold in dispersions in trichlorotrifluoroethane (Freon ®) under the trademark Vydax ® by E. I. DuPont de Nemours, Inc. Vydax ® 550, in particular, has been found to be a very satisfactory form of the telomer for deposition on a granular base.

There is no sharp line of demarcation between the telomeric form and the polymeric form of tetrafluoroethylene, and for the purpose of this description, it is to be understood that the term "telomer" indicates a form of the compound with a low enough molecular weight to be available in dispersion, at least, if not in solution. It is true that Vydax ® may contain particles of the polymerized form of tetrafluoroethylene that can deposit out in the telomer layer on the granular base, but such particles do not bond together. However, since they have the proper chemical composition to enter into the desired oxidation reaction with lithium, they do no harm.

It is believed that almost any tetrafluoroehtylene or similar analogous compound can be employed as the reactive material in any of the embodiments in FIGS. 1-3 as far as compatibility, i.e. non-reactivity with lithium at customary storage temperatures, is concerned. Such a characteristic is particularly important in the embodiment in FIG. 2 in which the reactive layer 26 is directly in contact with the lithium core 24. When there is, as in the embodiments in FIGS. 1 and 3, a barrier layer free of gaps and pinholes between the core and the reactive material so as to isolate one from the other, the potential for undesired reaction is reduced. However, even if there is a barrier layer that has a higher melting point than lithium and is located between the lithium core and the reactive layer, such barrier layer will still be subject to stress from expansion of the core, if the granule receives heat from any source. Thus, the reactive layer, whether it is the layer 16 or 18 in FIG. 1 or the layer 33 in FIG. 3, should not be applied at a temperature above the melting temperature of lithium and preferably not above about 150° C. This may, in turn, require the reactive material to be applied by means of a solvent-like carrier, which must not react with the lithium. It must either be non-reactive with lithium by nature at the temperature of application, or it must not penetrate the barrier layer. It is not expected that the barrier layer will be impermeable to all usable solvents.

Figure 5:
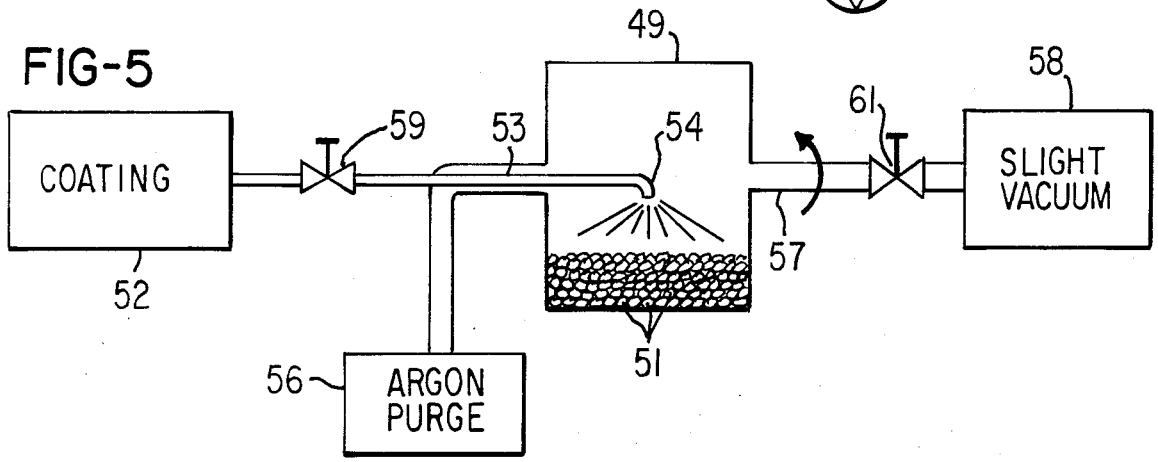
FIG. 5 is a schematic representation of apparatus for depositing exothermally reactive telomeric material on granular bases.

The reactive layer is applied in, for example, an apparatus such as is shown schematically in FIG. 5. This apparatus includes a sealed tumbler 49 holding a quantity of granules that constitute a granular base 51 to be coated. The granular base may consist of lithium core granules on which a barrier layer, such as either the layer 16 or the layer 18 in FIG. 1 or the layer 32 in FIG. 3, has previously been formed, or it may consist of lithium core granules, like the cores 24 in FIG. 2, on which there is no barrier layer. In either case, the granular base 51 is agitated by rotation of the tumbler on the axis. At the same time, a suitable reactive material, such as Vydax ® 550 dispersed in Freon ® is conveyed from a supply 52 through a pipe 53 coaxial with the tumbler 49 and exits into the interior of the tumbler through a spray nozzle 54 at the end of the pipe. The reactive material sprayed over the tumbling granular base produces an even coating on the individual granules.

The liquid carrier of the reactive telomer being sprayed on the grnular base prevents any of the lithium granules from being heated by friction to a temperature at which they would be oxidized by the telomer, but it is also important that oxidants other than the telomer be prevented from attacking any bare part of the lithium surface. To provide a safe environment not conducive to oxidation of the lithium, the interior of the tumbler may be purged by an inert gas from a source 56. Argon has been found to be useful for that purpose.

When the reactive material is being sprayed on a granular base that already include a barrier layer that prevents the reactive material from reaching the lithium, it is not necessary to purge the interior of the tumbler 49 with an inert gas. However, as an added precaution, it may still be desirable to purge the tumbler with an inert gas, even if the granules do include a barrier layer.

An exit tube 57 coaxial with the tumbler 49 may be connected to a slight vacuum source 58.

In the usual case, the granular base 51 will be agitated through rotation of the tumbler while the coating material is being sprayed thereon through the spray nozle 54. After a predetermined time, a valve 59 may be closed to terminate the spraying operation. At the same time, a valve 61 may be opened to apply a slight vacuum to the interior of the tumbler 49. In the usual case, the vacuum need be only on the order of 3-4 inches of water where a highly volatile solvent, such as trichlorotrifluoroethane is being utilized.

After the solvent has evaporated from the liquid applied to the granular base 51 within the tumbler, the valve 61 may be closed and the valve 59 reopened to begin a second spraying step. This procedure may be repeated as often as desired until a desired thickness of the layer of reactive material on the granular base has been achieved.

It is highly desirable that only a slight vacuum be applied to the interior of the tumbler 49 when highly volatile solvents are employed as carriers for the telomeric material. If too great a rate of evaporation occurs, imperfections in the layer of reactive material may occur. Thus, by using a relatively slight vacuum, evaporated solvent can be withdrawn from the interior of the tumbler 49 without causing such a high rate of evaporation as to damage the layer of reactive material. In some instances, it is desirable to introduce a diluent into the liquid being sprayed on the granular base 51 to reduce further the rate of evaporation. For example, in the case of the application of Vydax ® 550, a diluent such as 1,1,1-trichloroethane may be utilized as the means to reduce the rate of evaporation.

If the reactive layer has been formed on lithium cores, such as the core 24 in FIG. 2, that have no barrier layer, such a layer must be formed after the reactive layer. While the granules that have been coated only with a layer of reactive material are relatively stable and can be transferred to the apparatus shown in FIG. 4 to have the barrier layer formed on them, they must be handled with some care, lest the frictional engagement previously described take place. The granules may be exposed to air for several minutes without having any noticeable reaction.

It is to be noted that the process of depositing a parylene barrier layer on granules in the apparatus in FIG. 4 requires that the parylene dimer be volatilized, or vaporized, in the tube 36, which requires heating the dimer to a temperature on the order of 175° C., and that the vapor be pyrolyzed in the furnace 38 operating at a temperature of about 680° C. The latter temperature is well in excess of the temperature required to initiate the exothermic oxidation reaction between the lithium cores and the reactive telomer layer 26 on them, assuming the granular base to be coated with a barrier layer is simply granules of lithium coated with the reactive layer. However, the vacuum pump 42 is at the end of the parylene deposition apparatus and would thus tend to draw any granules toward that end. Furthermore, the granules on which the barrier layer is to be deposited, whether those granules be bare lithium cores 13, as illustrated in FIG. 1 or lithium cores coated with reactive material, are at approximately room temperature, not at the much higher temperatures through which the parylene material passed on its way to being deposited as a polymerized barrier layer on those granules. By careful operation of the coating apparatus in FIG. 4, the granules of lithium coated with a reactive telomer need not be subjected to mechanical shock sufficient to initiate the oxidation reaction.

Once the granules have received a barrier coating, whether it is between the lithium core and the reactive layer or outside of the reactive layer, they are much less sensitive to mechanical shock and can be handled substantially more easily. Parylene has good mechanical properties at temperatures as high as 275° C., which may raise the temperature required to initiate the exothermic oxidation reaction between the lithium and the telomer, but 275° C. is still much lower than the temperature produced by that reaction, and so the parylene layer would not prevent that reaction from expanding hypergolically and would not even make it much more difficult to initiate deliberately.

While, as previously stated, there is no sharp demarcation between the telomeric and polymeric forms of tetrafluoroethylene in terms of there being a specific number of monomeric radicals to denote the upper limit of the telomer or the lower limit of the polymer, there are substantial differences between the telomer as used and the polymer known as Teflon ®. Those differences are listed in the following table:

| Property | TFE Telomer | Poly-TFE |
| --- | --- | --- |
| Average molecular weight | 2500 | $2-9 \times 10^6$ |
| Melting point as indicated by a volume increase of about 30% | 275° C. | Approx. 355° C. (first time) |
| Consistency | Soft & waxy | Hard & non-stick |
| Proportion soluble in Freon ® 113 and Trichloroethane | About 10% | 0% |
| Tendency to absorb processing solids | High | Very low |
| Cost in $/lb. of active ingredient | $83 (in Vydax ® 550) | About $5 |

It should be noted that trichloroethane, previously referred to as a possible diluent to reduce the rate of evaporation in the application of Vydax ® to the granular base 51 in FIG. 5, reacts readily with numerous metals and alloys much less reactive than lithium. Unfortunately, trichloroethane may not entirely evaporate from the surfaces of the granular base, even if the pump were set to pull a much harder vacuum than the 3-4 inches of water previously indicated. Instead, traces of it may remain in pockets on the surfaces. In the case of Buford's pellets, such pockets can form sites of low-reaction-energy, making those pellets more sensitive to stimuli, such as mechanical shock, that can set them off improperly. However, where the lithium cores are protected by a barrier layer of parylene, such as the layers 16 and 18 in FIG. 1 and the layer 32 in FIG. 3, the sensitivity of the granules will not be significantly increased. To the extent that the stimulus could be direct core-to-core frictional engagement, the external barrier layer 27 of the granules 23 in FIG. 2 would protect those granules, even if pockets of trichloroethane remained inside the barrier layer.

What is claimed is:

1. Encapsulated lithium based fuel comprising a plurality of granules, each of the granules comprising:
   (a) a core of metallic lithium having a nominal diameter in the range from about 0.1 mm to about 25 mm; and
   (b) first and second layers of encapsulation material formed thereon, one of the layers comprising a thin layer of predominantly fluorine substituted telomeric reactive material that reacts exothermally with lithium at temperatures above approximately the melting point of lithium, and the other of the layers being a thin barrier layer of material that has better structural integrity than the layer of reactive material and is substantially less chemically reactive with lithium than is the reactive material and is free of pinholes, whereby at least the lithium core of each of the granules is entirely isolated from at least the lithium core of any of the other granules.

2. The lithium based fuel of claim 1 in which the barrier layer is poly-para-xylylene.

3. The lithium based fuel of claim 2 in which the barrier layer has a thickness in the range of about one micron to about six microns.

4. The lithium based fuel of claim 2 in which the barrier layer is dichloro-polypara-xylylene.

5. The lithium based fuel of claim 1 in which the reactive material comprises a tetrafluoroethylene telomer.

6. The lithium based fuel of claim 5 in which the metallic lithium core constitutes about 60–86 weight percent, the reactive material constitutes about 40–14 weight percent and has a nominal thickness of about 0.060 inches or less, and the barrier layer constitutes about 0.1 to about 3 weight percent.

7. The lithium based fuel of claim in which the metallic lithium core constitutes about 60–86 weight percent of each of the granules.

8. The lithium based fuel of claim 1 in which the reactive material comprises Vydax ® 550.

9. The lithium based fuel of claim 1 in which the first one of the encapsulation layers formed on the metallic lithium core is the barrier layer, and the layer of reactive material is formed on top of the barrier layer.

10. The lithium based fuel of claim 9 comprising, in addition, a second barrier layer of material that has better structural integrity then the layer of reactive material formed on top of the layer of reactive material.

11. The lithium based fuel of claim 1 in which the first one of the encapsulation layers formed on the metallic lithium core is the layer of reactive material, and the barrier layer is formed on top of the layer of reactive material.

12. A method of multiply encapsulating granular base material comprising lithium core granules, said method comprising:
   (a) forming a barrier layer on the granular base material by the steps of:
      (i) vaporizing dipara-xylylene dimer material,
      (ii) pyrolyzing the resulting vapors to form reactive monomeric radicals,
      (iii) passing the monomeric radicals to a vacuum deposition zone,
      (iv) tumbling the granular base material in the deposition zone,
      (v) sifting the granular base material during such tumbling, and (vi) depositing the monomeric radicals on the granular base material to cause the radicals to be adsorbed and polymerized on the surfaces of the granular base material; and (b) forming a reactive telomeric layer on the granular base material by the steps of:
(i) contacting the granular base material with a liquid carrier containing a predominantly fluorine substituted telomeric material, and
(ii) evaporating the carrier.

13. The method of claim 12 in which the reactive telomeric layer is formed after the barrier layer is formed.

14. The method of claim 13 comprising the additional steps of:
(a) vaporizing more dipara-xylylene dimer material;
(b) pyrolyzing the resulting vapors to form reactive monomeric radicals;
(c) passing the monomeric radicals to a vacuum deposition zone;
(d) tumbling the granular base material in the deposition zone;
(e) sifting the granular base material during such tumbling; and
(f) depositing the monomeric radicals on the granular base material to cause the radicals to be adsorbed and polymerized on the exposed surfaces of the previously formed layers encapsulating the granular base material.

15. The method of claim 12 in which the reactive telomeric layer is formed on the surfaces of the lithium core granules, and the step of contacting the granular base material with a liquid carrier containing a predominantly fluorine substituted telomeric material is performed in an environment inert to lithium, and the barrier layer is formed thereafter.

16. The method of claim 15 in which the granular base material is kept at a temperature substantially below the melting point of lithium during the tumbling, sifting and depositing steps.

* * * * *